United States Patent
Chambers et al.

(10) Patent No.: US 12,165,365 B2
(45) Date of Patent: Dec. 10, 2024

(54) COLOR IMAGE RENDERING FOR GROUND-PENETRATING RADAR SYSTEMS

(71) Applicants: Lawrence Livermore National Security, LLC, Livermore, CA (US); Teres Technologies, Inc., Loveland, CO (US)

(72) Inventors: David Chambers, Livermore, CA (US); Jeffrey Edward Mast, Loveland, CO (US)

(73) Assignees: Lawrence Livermore National Security, LLC, Livermore, CA (US); Teres Technologies, Inc., Loveland, CO (US)

(*) Notice: Subject to any disclaimer, the term of this patent is extended or adjusted under 35 U.S.C. 154(b) by 160 days.

(21) Appl. No.: 18/148,757

(22) Filed: Dec. 30, 2022

(65) Prior Publication Data

US 2024/0221225 A1 Jul. 4, 2024

(51) Int. Cl.
*G01S 13/88* (2006.01)
*G01S 13/89* (2006.01)
(Continued)

(52) U.S. Cl.
CPC ............... *G06T 7/90* (2017.01); *G06T 3/40* (2013.01); *G01S 13/885* (2013.01); *G06T 2200/04* (2013.01)

(58) Field of Classification Search
CPC . G06T 7/90; G06T 3/40; G06T 11/001; G06T 11/40; G06T 15/003; G06T 15/08;
(Continued)

(56) References Cited

U.S. PATENT DOCUMENTS

| 8,854,248 B2 | 10/2014 | Paglieroni et al. |
| 2010/0315280 A1* | 12/2010 | Bakhtar ............... G01S 13/88 342/22 |

(Continued)

OTHER PUBLICATIONS

Worthmann, Brian M., et al., "Clutter Distributions for Tomographic Image Standardization in Ground-Penetrating Radar," IEEE Transactions on Geoscience and Remote Sensing, vol. 59, No. 9, Sep. 2021.

(Continued)

*Primary Examiner* — Wesner Sajous
(74) *Attorney, Agent, or Firm* — Perkins Coie LLP

(57) ABSTRACT

Devices, methods and techniques related to image rendering for ground-penetrating radar (GPR) systems are disclosed. In one example aspect, a method for producing one or more images associated with a GPR includes receiving information representative of signals received by the GPR, determining at least three frequency bands associated with the received information, assigning color values to the received information corresponding to the at least three frequency bands, and generating a color image for the one or more objects by combining the received information in all of the at least three frequency bands together such that the color values in the color image indicate a size of the one or more objects, a depth at which the one or more objects is buried underground, or an electrical permittivity of the one or more objects.

26 Claims, 6 Drawing Sheets
(3 of 6 Drawing Sheet(s) Filed in Color)

(51) Int. Cl.
  *G06T 3/40*   (2024.01)
  *G06T 7/90*   (2017.01)
  *G09G 5/02*   (2006.01)
  *H04N 1/60*   (2006.01)
  *H04N 5/57*   (2006.01)

(58) Field of Classification Search
  CPC . G06T 2207/10024; G06T 2207/10028; G01S 13/885; G01S 13/90; G01S 13/9027; G01S 13/24; G01S 13/28; G01S 13/22; G01S 13/9064; G01S 13/9058; G01S 13/347; G01S 7/2923; G01S 7/35; G01S 7/003; G09G 5/02; G09G 5/026; G09G 2320/0673; H04N 1/60; H04N 1/6002; H04N 1/6008; H04N 5/202
  See application file for complete search history.

(56) References Cited

U.S. PATENT DOCUMENTS

2016/0103216 A1* 4/2016 Whelan ............... G01S 13/90
                                                       342/25 A
2016/0139259 A1* 5/2016 Rappaport ......... G01S 13/0209
                                                       342/21

OTHER PUBLICATIONS

ICRAR, Hurley-Walker, Natasha, et al., "Australian Desert Telescope Views Sky in Radio Technicolour," ICRAR, 2016, accessed via: https://www.icrar.org/gleam/.
Strickland, Ashley, "Unknown space object beaming out radio signals every 18 minutes remains a mystery," CNN, Jan. 2022.

* cited by examiner

COLOR IMAGE RENDERING FOR GROUND-PENETRATING RADAR SYSTEMS

STATEMENT REGARDING FEDERALLY SPONSORED RESEARCH OR DEVELOPMENT

This invention was made with Government support under Contract No. DE-AC52-07NA27344 awarded by the United States Department of Energy. The Government has certain rights in the invention.

TECHNICAL FIELD

This document generally relates radar imaging, and more specifically, image rendering for ground-penetrating radar (GPR) systems.

BACKGROUND

Many technologies that seek to identify the presence of an object within a medium may use ground-penetrating radar antennas that are directed into the ground with the soil being the medium. Ground-penetrating radar (GPR) is a geophysical method that uses radar pulses to image the subsurface. The GPR systems can be used to detect not only metallic objects but also non-metallic objects whose dielectric properties are sufficiently different from those of the soil.

SUMMARY

The disclosed embodiments relate to methods, devices and systems for color image rendering for GPR systems indicative of depths, sizes, and/or material properties of the one or more objects detected by the GPR systems.

In one example aspect, a signal processing system includes a processor that is configured to receive a signal from the ground-penetrating radar system. The signal represents one or more underground objects in a scene. The processor is configured to determine a frequency band associated with the signal and generate, using a first mapping scheme, an initial color image for the one or more underground objects based on the signal. The first mapping scheme includes dividing the signal into multiple sub-bands of the frequency band, and mapping at least part of the multiple sub-bands of the signal into multiple colors in a color space. For the mapping, a value of the signal is scaled using a scaling factor determined based on a value range associated with at least one color. The processor is also configured to generate a refined image for the one or more underground objects in the scene by updating the initial color image using a second mapping scheme.

In another example aspect, a method for processing a signal from a ground-penetrating radar system is disclosed. The method includes determining a frequency band associated with the signal from the ground-penetrating radar system. The signal represents one or more underground objects in a scene. The method includes generating, using a first mapping scheme, an initial color image for the one or more underground objects based on the signal. The first mapping scheme includes dividing the signal into multiple sub-bands of the frequency band and mapping at least part of the multiple sub-bands of the signal into multiple colors in a color space. For the mapping, a value of the signal is scaled using a scaling factor determined based on a value range associated with at least one color. The method also includes generating a refined image for the one or more underground objects in the scene by updating the initial color image using a second mapping scheme.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

The ground-penetrating radar (GPR) is a non-intrusive method of surveying the subsurface to investigate underground utilities such as concrete, asphalt, metals, pipes, cables or masonry. The GPR systems use high-frequency radio waves (usually in the range 10 MHz to 2.6 GHz) and ultrawide frequency band (around 4 to 5 GHz). A GPR transmitter and antenna emits electromagnetic energy into the ground. When the energy encounters a buried object or a boundary between materials having different permittivity values, it is reflected, refracted, and scattered back to the surface. A receiving antenna can then record the variations in the return signal.

Figure 1:
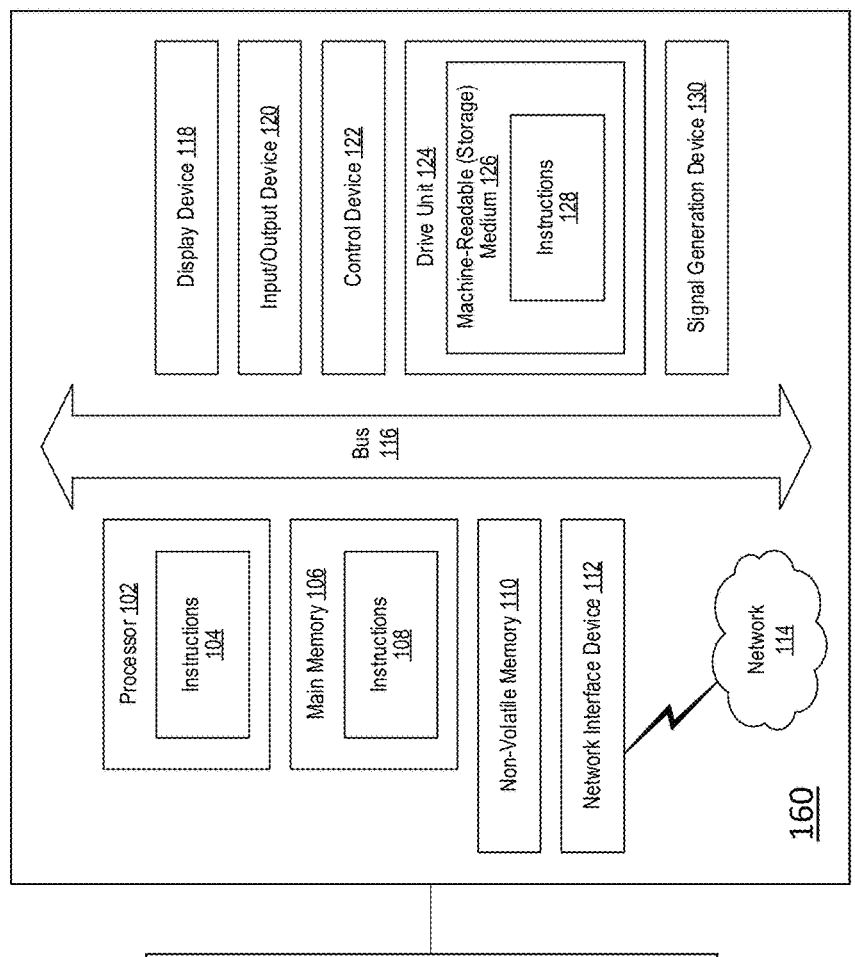
FIG. 1 illustrates an example GPR system in accordance with one or more embodiments of the present technology.
Figure 1:
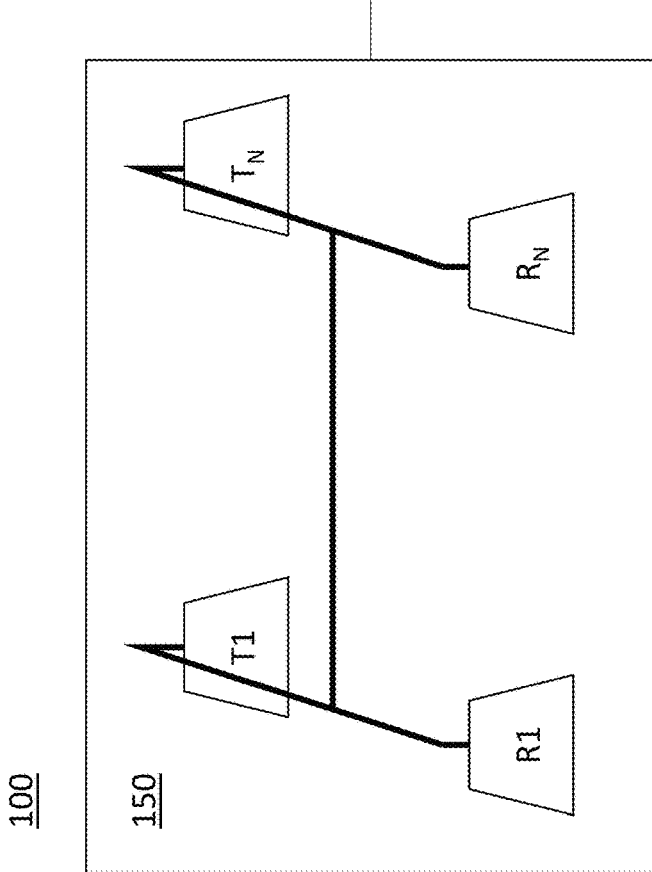

FIG. 1 illustrates an example GPR system 100 in accordance with one or more embodiments of the present technology. The GPR system 100 includes a radar system 150. The radar system 150 includes an array of transmitters $T_1, \ldots, T_N$ and receivers $R_1, \ldots, R_N$. The array can be mounted on a vehicle that is driven or otherwise moved along a path to detect buried objects. In some examples, the array can also be a stationary part of a medical device in which a patient is moved under the array. In the GPR system 100, the signals received by the radar system 150 are transformed mathematically by a computer system 160 for signal processing. As shown, the computer system 160 can include: one or more processors 102, main memory 106, non-volatile memory 110, a network interface device 112, video display device 118, an input/output device 120, a control device 122 (e.g., keyboard and pointing device), a drive unit 124 that includes a storage medium 126, and a signal generation device 130 that are communicatively connected to a bus 116. The bus 116 represents one or more physical buses and/or point-to-point connections that are connected by appropriate bridges, adapters, or controllers.

Various common components (e.g., cache memory) are omitted from FIG. 1 for brevity. Instead, the computer system 160 is intended to illustrate a general diagram that allows implementation of various disclosed embodiments.

The computer system 160 can take any suitable physical form. For example, the computing system 160 can share a similar architecture as that of a server computer, personal computer (PC), tablet computer, mobile telephone, wearable electronic device, network-connected ("smart") device (e.g., a television or home assistant device), AR/VR systems (e.g., head-mounted display), or any electronic device capable of executing a set of instructions that specify action(s) to be taken by the computing system 160. In some implementation, the computer system 160 can be an embedded computer system, a system-on-chip (SOC), a single-board computer system (SBC) or a distributed system such as a mesh of computer systems or include one or more cloud components in one or more networks. Where appropriate, one or more computer systems 160 can perform operations in real-time, near real-time, or in batch mode. The memory (e.g., main memory 106, non-volatile memory 110, machine-readable medium 126) can be local, remote, or distributed. Although shown as a single medium, the machine-readable medium 126 can include multiple media (e.g., a centralized/distributed database and/or associated caches and servers) that store one or more sets of instructions 128. The machine-readable (storage) medium 126 can include any medium that is capable of storing, encoding, or carrying a set of instructions for execution by the computing system 160. The machine-readable medium 126 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as non-volatile memory 110 and/or volatile memory, removable flash memory, hard disk drives, optical disks, and transmission-type media such as digital and analog communication links. In general, the routines executed to implement examples herein can be implemented as part of an operating system or a specific application, component, program, object, module, or sequence of instructions (collectively referred to as "computer programs"). The computer programs typically comprise one or more instructions (e.g., instructions 104, 108, 128) set at various times in various memory and storage devices in computing device(s). When read and executed by the processor 101, the instruction(s) cause the computing system 160 to perform operations to execute elements involving the various aspects of the disclosure. It should be noted that in some embodiments, at least part of the computational architecture and capabilities associates with the computer system 160 is incorporated into the radar system 150, while in some embodiments, the computer system 160 can be located at a remote location with respect to the radar system 150.

In FIG. 1, the signals received by the radar system 150 are transformed by the computer system 160 into intensity values that are associated with a collection of locations in the ground below the radar. These locations are considered to be little blocks (e.g., voxels in three dimensions, pixels in two dimensions) that collectively cover a region of view by the radar. In conventional systems, the intensity values are interpreted as the brightness of the radar reflections from the material at the locations of the voxels or pixels. A high brightness value at a given voxel can be caused by the presence of an object or a material interface at the voxel location. Since intensity is represented using a single value. The result is a scalar image.

Figures 2A, 2B:
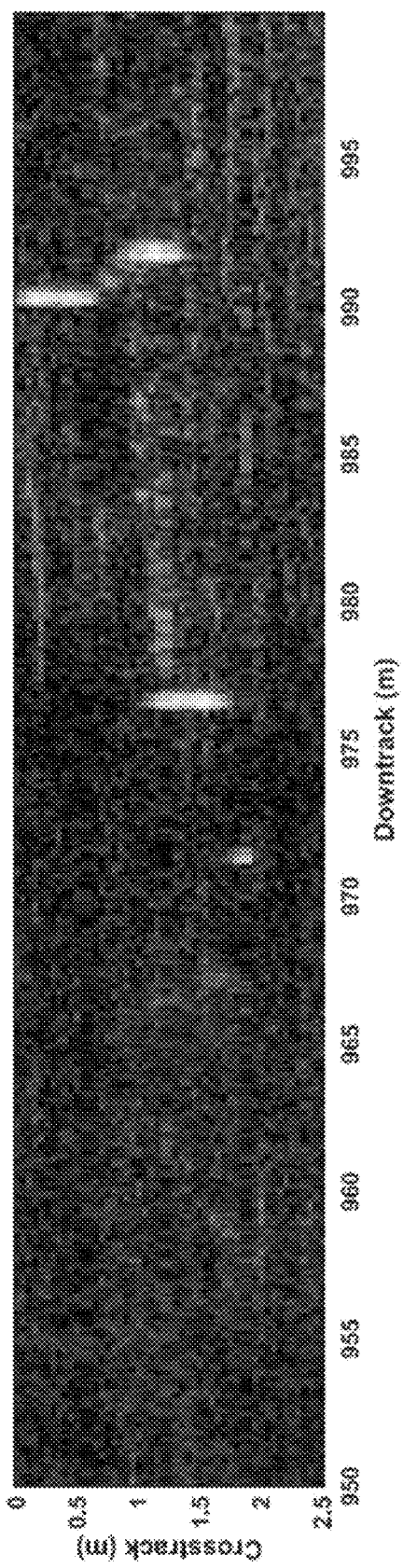
FIG. 2A illustrates a top view of an example scalar image.
FIG. 2B illustrates a side view of the scalar image corresponding to FIG. 2A.

Scalar images are easily rendered as gray scale images. FIGS. 2A-B illustrate two images produced using an ultra-wide-band ground-penetrating impulse radar where the intensity values are rendered in gray scale. FIG. 2A illustrates a top view of an example scalar image. FIG. 2B illustrates a side view of the scalar image corresponding to FIG. 2A. Bright spots indicate regions of high reflectivity produced by buried objects or interfaces between materials. However, as shown in FIGS. 2A-2B, it can be difficult to distinguish features based on the gray scale values, particularly regarding whether certain pixel values indicate shapes of objects, the depths of the objects, or imaging artifacts.

To address the limitation of scalar images, certain radar imaging modalities can produce both intensity and phase, or intensity and Doppler shift, for each voxel. Such images are examples of vector images. The rendering of vector images requires mapping multiple numerical values for each voxel/pixel into features in such a way that they can be easily interpreted on a two-dimensional display. If the vector for each voxel has three components, the three components can be rendered using a color image, where each component is mapped to a value in a particular color space. For example, the Red-Green-Blue (RGB) color space can be used. As another example, the YCbCr color space can be used for efficiency image compression and storage.

In some embodiments, the three values for each pixel represent intensities for three different frequency bands of the radar data. In particular, the low, middle, and high frequency bands can be mapped to the red, green, and blue color values, respectively, resulting in an intuitive representation of the values of different frequency bands. The resulting color for each pixel is directly related to the corresponding combination of radar frequency band intensities. Such images are also sometimes referred to herein as triband images. The triband images can capture the changes in the reflectivity as a function of the frequency band, and enable identification of features that would be otherwise difficult or even impossible to discern.

Figure 3A:
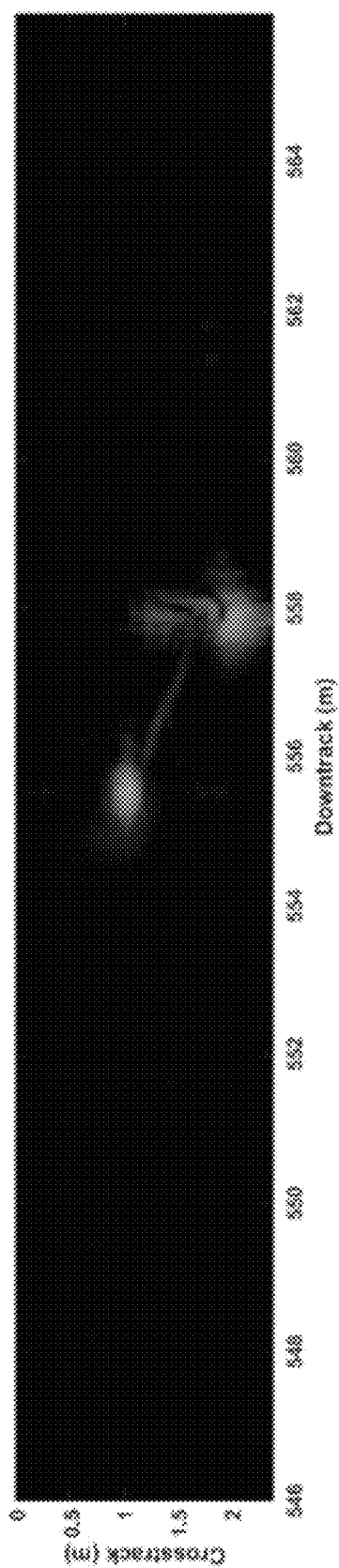
FIG. 3A illustrates a top view of an example triband image in accordance with one or more embodiments of the present technology.
Figure 3B:
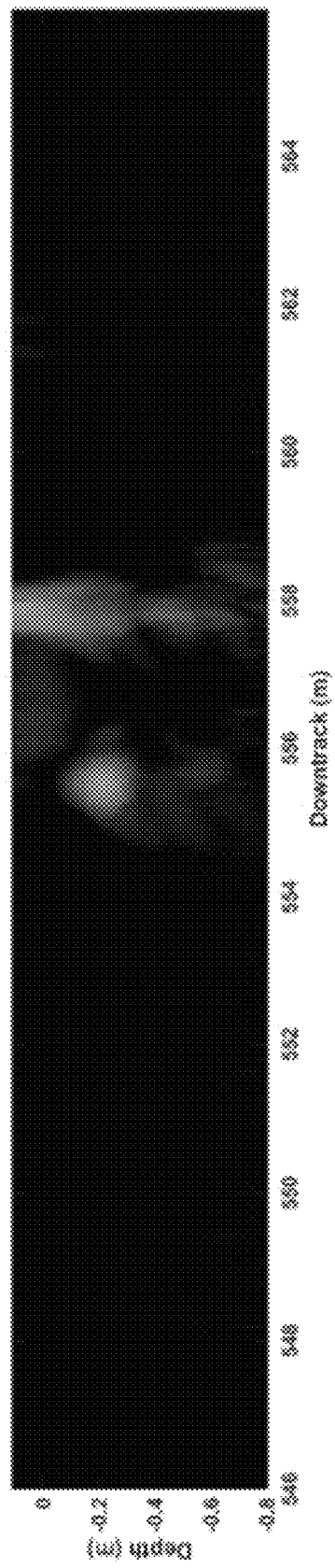
FIG. 3B illustrates a side view of an example triband image corresponding to FIG. 2A in accordance with one or more embodiments of the present technology.

FIGS. 3A-B illustrate examples of triband images where the low, middle, and high frequency bands are mapped to red, green, and blue values. The color of each feature in the image is proportional to the relative radar reflectivity in each frequency band of the object that generates the feature. FIG. 3A illustrates a top view of an example triband image in accordance with one or more embodiments of the present technology. In FIG. 3A, the object on the left appears reddish, indicating that it is probably buried deeper in the ground as compared to the object on the right as soil may have attenuated higher frequencies (e.g., blue/green) more than low frequencies (e.g., red). FIG. 3B illustrates a side view of an example triband image corresponding to FIG. 3A in accordance with one or more embodiments of the present technology. As shown in FIG. 3B, the object on the left in FIG. 3B is probably located at 0.2 m below ground (based on the depth scale on the vertical axis), while the object on the right is very close to the ground. In FIG. 3B, the red stripes below each object indicate imaging artifacts that appear at low radar frequencies (e.g., resonance or echo of the radar signal).

Figure 3C:
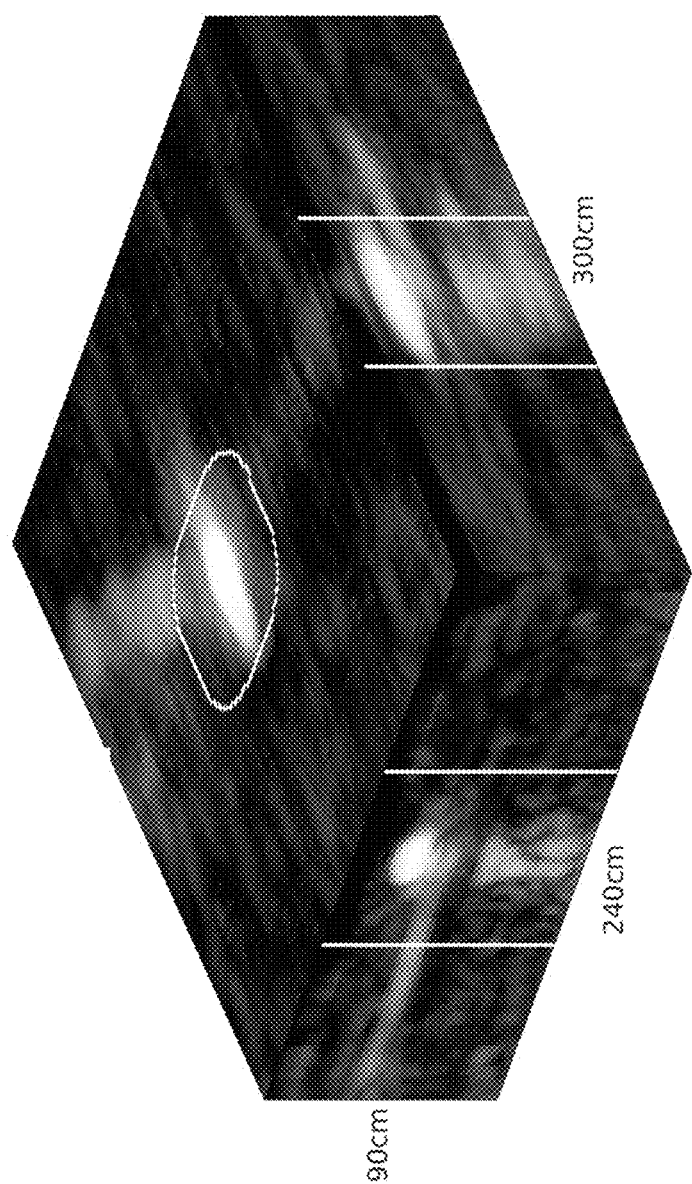
FIG. 3C illustrates an example of triband volume where the low, middle, and high frequency bands are mapped to red, green, and blue values in accordance with one or more embodiments of the present technology.

FIG. 3C illustrates an example of triband volume where the low, middle, and high frequency bands are mapped to red, green, and blue values in accordance with one or more embodiments of the present technology. The example volume shown in FIG. 3C can be constructed based on volume rendering using a set of two-dimensional triband images (such as shown in FIGS. 3A-B). Mapping the three bands into color enhances the interpretation of different features in the image. As shown in FIGS. 3A-C, the different colors can help discriminate between different objects (e.g., the bright object located close to the ground), identify imaging artifacts (e.g., the stripes having lower frequencies that are likely caused by the resonance or echo of the radar signal), and separate background variation from compact objects. Because the use of color allows easier differentiation between the object(s) and imaging artifact(s), additional image processing steps can be carried to compensate for attenuation, thereby significantly improving rendering quality to accurately show the target object(s).

Furthermore, the reflection of the radar signal represented in different frequency bands (e.g., using different colors) can indicate the size of the object relative to the wavelength and the depth of the object (as the lower frequency penetrates the ground more efficiently). In addition to size and depth, the reflectivity in each frequency band can also indicate the electrical permittivity and/or conductivity of the object. In some embodiments, when the size and/or depth differences between objects are known as a priori information, the difference in the color values can indicate whether the object is metal, void, or material having a specific material or composition.

Figure 4:
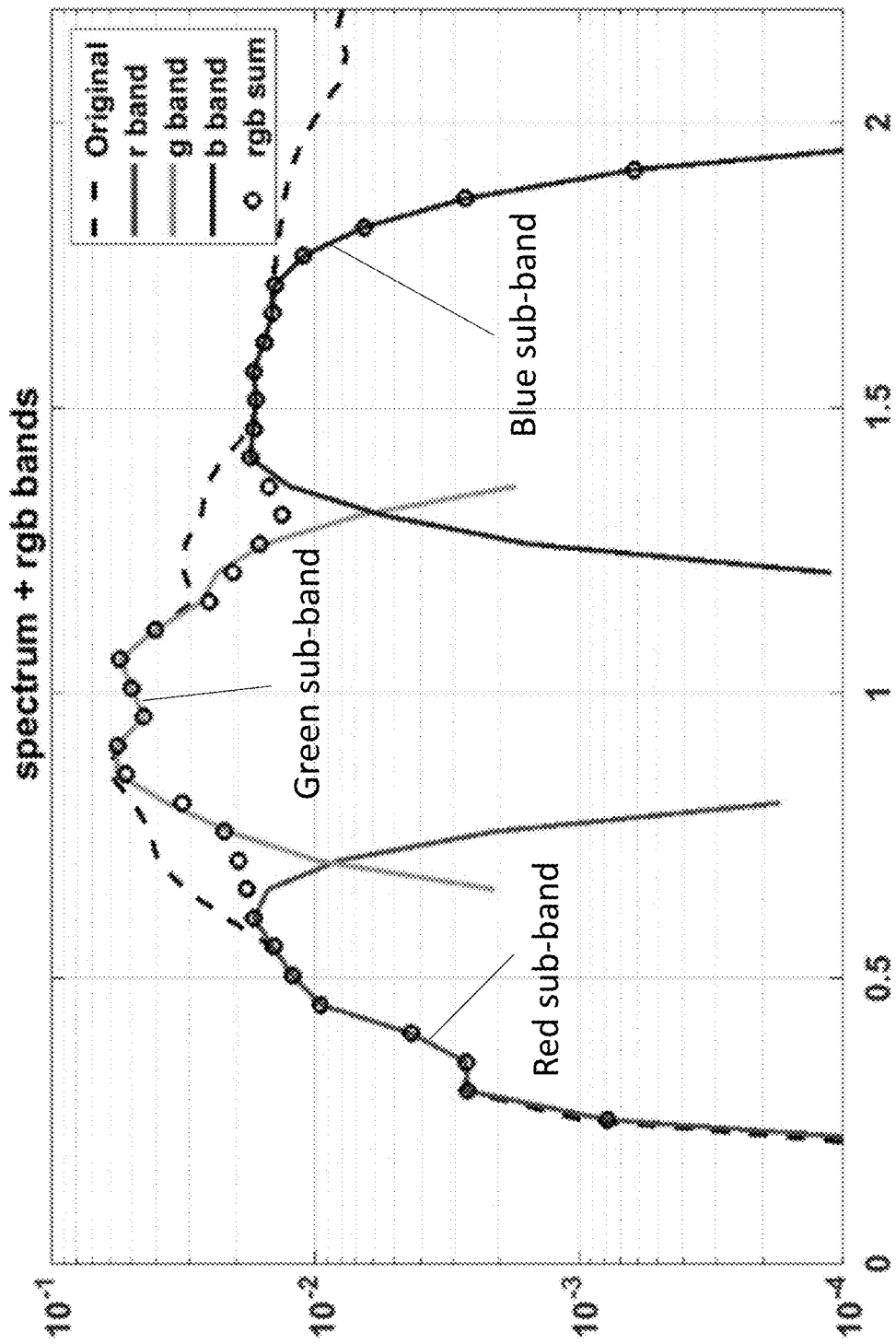
FIG. 4 illustrates an example of overlapping frequency windows in accordance with one or more embodiments of the present technology.

One example method of creating a triband image from ultrawide band GPR data is to use overlapping frequency windows of substantially equal widths to define sub-bands of frequencies within the full radar bandwidth. FIG. 4 illustrates an example of overlapping frequency windows in accordance with one or more embodiments of the present technology. In FIG. 4, three sub-bands—red sub-band, green sub-band, and blue sub-band—are defined by overlapping Tukey (tapered cosine) windows whose sum is approximately the same as a Tukey window applied over the entire usable radar bandwidth.

In some embodiments, a triband image can be generated by mapping three frequency bands into the RGB color values, where the frequency bands are substantially equal in width. The color values are proportional to the intensity values in each band, and the assignment from radar frequency band (low, middle, high) is substantially equivalent to the optical frequency band order. This mapping approach has the advantage of being very intuitive for someone with a physics or engineering background to distinguish the frequency range values. In some embodiments, the width of each sub-band can change. For example, wider sub-band(s) can be used for lower frequencies, while narrower sub-band(s) can be used for higher frequencies.

In some embodiments, the idea of generating triband images can be extended to generate multi-band images representing multiple frequency bands. For example, for four frequency bands, three frequency bands can be mapped to RGB color space while overlaying a contour map of the intensities for the fourth band. In some embodiments, three frequency bands can be mapped to RGB color space while the fourth frequency band is mapped to the alpha channel (e.g., indicating transparency of the image). As another example, the four frequency bands can be mapped as a three-dimensional surface whose color is determined from three bands, and a height above a reference plane that is proportional to the intensity of the fourth frequency band.

In some embodiments, different ways can be adopted to assign radar bands to color values and/or surface height values. For example, the high frequency radar band can be assigned the red color value, and the low frequency band can be assigned the blue color value. In some embodiments, the relationship between intensity value to color value is inverted. For example, high radar intensities can be assigned low color values, and vice versa. In some embodiments, a subset of the frequency bands can be mapped using the inverted relationship between intensity and color values. In some embodiments, the range of radar intensities can be mapped to a smaller color interval, e.g., 100 to 255, for a given sub-band.

In some embodiments, the mapping can be nonlinear. For example, an increment of color value associated with a given increment in radar intensities can change as the intensity value increases. The choice of mapping and color assignment can be based on user preferences. The choice of mapping can also be optimized to enhance the visibility of particular objects in the field of view. In some embodiments, an adaptive and/or iterative mapping approach can be adopted. For example, an initial mapping of the radar intensities can be performed. A default mapping scheme that uses substantially equal frequency sub-bands (e.g., six equal sub-bands) with linear value increments is used to generate an initial image. Based on a preliminary analysis of the initial image (e.g., depth and/or size of the objects shown in the initial image) and/or other available a priori information about the scene (e.g., target material types and/or target object types), alternative sub-bands and/or a subset of the sub-bands (e.g., two or three bands) can be used to generate a refined image. For example, metal objects can reflect various frequencies equally well. The combination of equal intensities of red, green, and blue colors can appear white in the triband image. As another example, water changes the electrical permittivity and conductivity of porous materials. Materials that are saturated with water have high conductivities and can appear redder as compared to materials that are dry. Yet as another example, voids can act as resonant cavities and strongly reflect frequencies whose wavelengths are close to the size of the void. These characteristics of the objects and/or the scene can be used for the preliminary analysis of the initial image so as to enable the refinement of the image. In some embodiments, non-linear value increments can be adopted to emphasize certain values in a particular sub-range based on a priori knowledge of the target materials/object types.

In some embodiments, an iterative mapping of the radar signals can be performed to produce an image that best match a priori information about the scene. For example, if the soil is known to be highly attenuating, the frequency ranges for each sub-band can be restricted to the lower frequency part of the radar band. The width of each sub-band then is adjusted iteratively to enhance the color contrast. The final triband image can be generated after performing one or more iterations of the mapping.

In some embodiments, the imaging algorithm calculates an image for each sub-band, then each image is scaled to a range of integers from 0 to 255, representing the intensity of each color. There are several ways to perform the scaling. One example way is to scale the highest intensity value over all bands to 255 and the lowest to 0 so as to preserve the relative values between sub-bands. If low frequencies produce lower intensities compared to high frequencies, the relative relationship is preserved between R and B color values. An alternative way is to normalize the intensity values in each sub-band prior to mapping them to RGB values. In this case the maximum intensity in each band maps to 255 and the lowest to 0, effectively equalizing the intensities across sub-bands. In some embodiments, if certain depth information is known as a priori information, the scale factor can be modeled as a function of depth to enable for effective showing of the target object(s).

In some embodiments, adaptive and/or iterative scaling can be performed. For example, an initial scaling factor can be applied (e.g., scaling all bands to preserve the relative values between sub-bands) to obtain an initial image. Based on the initial image and a priori information that is available, the scaling factor can be adapted or replaced to generate a different image. Furthermore, different scaling factors can be used for separate RGB channels.

Figure 5:
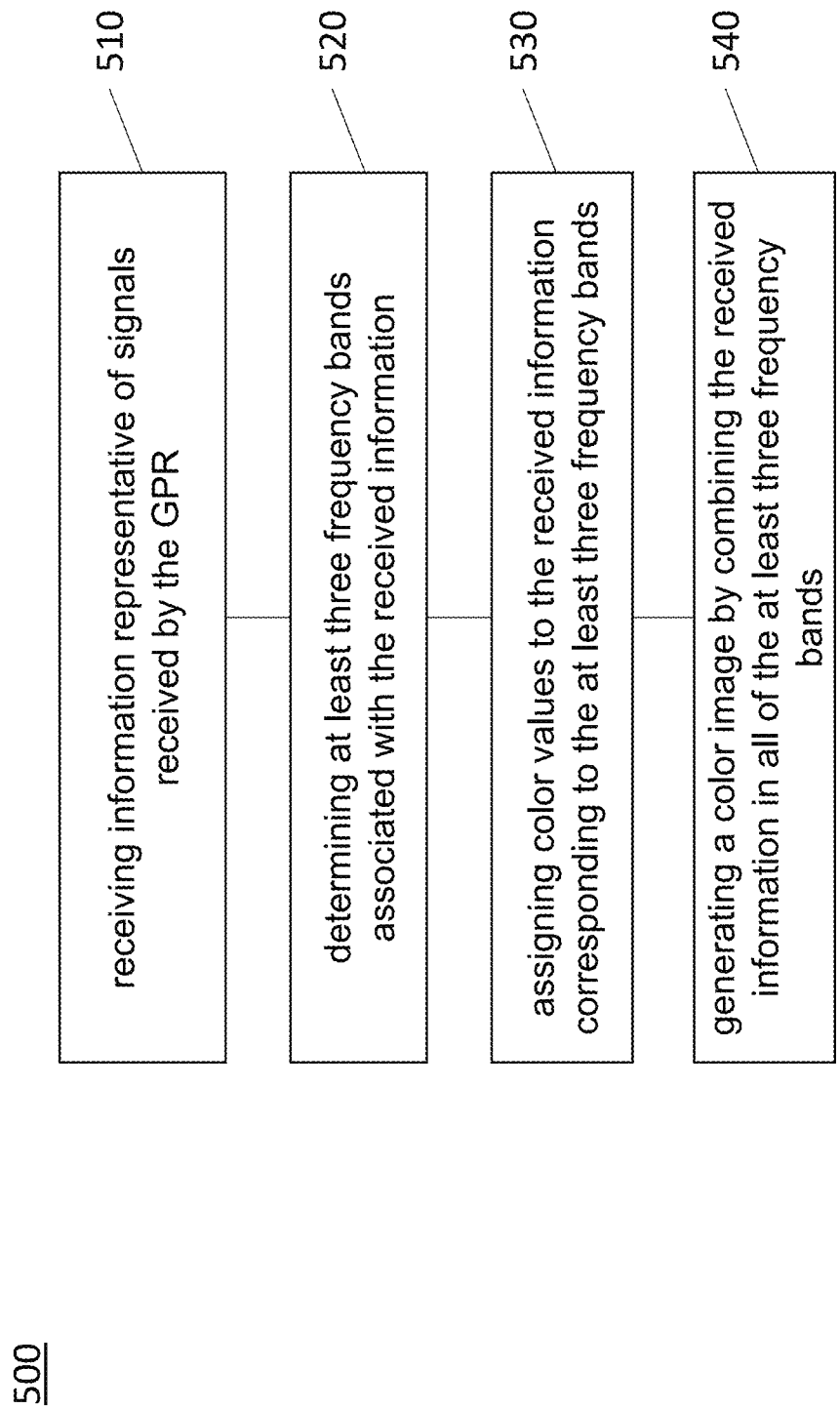
FIG. 5 is a flowchart representation of a method for processing a signal from a ground-penetrating radar system in accordance with one or more embodiments of the present technology.

FIG. 5 is a flowchart representation of a method 500 for producing one or more images associated with a GPR in accordance with one or more embodiments of the present technology. The method 500 includes, at operation 510, receiving information representative of signals received by the GPR in response to transmission of radar signals and interaction thereof with one or more objects. The method 500 includes, at operation 520, determining at least three frequency bands associated with the received information. The method 500 includes, at operation 530, assigning a first color value to the received information corresponding to a first of the at least three frequency bands, a second color value to the received information corresponding to a second of the at least three frequency bands, and a third color value to the received information corresponding to a third of the at least three frequency bands. The method 500 also includes generating a color image for the one or more objects by combining the received information in all of the at least three frequency bands together. The color values in the color image indicate a size of the one or more objects, a depth at which the one or more objects is buried underground, or an electrical permittivity of the one or more objects.

In some embodiments, the method includes generating a refined color image for the one or more objects by adjusting the at least three frequency bands associated with the received information based on the color image or a prior information about the one or more objects, and refining the color image by assigning a fourth color value to the received information corresponding to a first of the adjusted frequency bands, a fifth color to the received information corresponding to a second of the adjusted frequency bands, and a sixth color to the received information corresponding to a third of the adjusted frequency bands. In some embodiments, the method includes determining a final color image by generating the refined color image iteratively.

In some embodiments, the method includes generating more than three frequency bands. Three frequency bands can be selected for rendering the image. The selection of bands for rendering can change with a prior information or varying conditions such as soil moisture. One or more of the final three bands can be a combination of more than one sub-band.

In some embodiments, the at least three frequency bands partially overlap with each other. In some embodiments, the at least three frequency bands have substantially similar widths. In some embodiments, the first color value, the second color value, and third color value are assigned according to an optical frequency order of color values corresponding to a frequency order of the at least three frequency bands such that a color value having a lower optical frequency is assigned to a lower frequency band.

In some embodiments, the at least three frequency bands have different widths. A color value that has a lower optical frequency is assigned to a wider frequency band while a color value that has a higher optical frequency is assigned to a narrower frequency band.

In some embodiments, the at least three frequency bands comprise four frequency bands. The method includes assigning a surface height value to the received information corresponding to a fourth of the four frequency bands such that the color image is three-dimensional. In some embodiments, the at least three frequency bands comprise six frequency bands.

In some embodiments, the assigning of the first color value, the second color value, and the third color value includes scaling a value representing the received information in one of the at least three frequency bands corresponding to an overall range of values for a color space of the first color value, the second color value, and the third color value. In some embodiments, the assigning of the first color value, the second color value, and the third color value includes scaling a first value representing the received information in the first frequency band according to a range of the first color value, scaling a second value representing the received information in the second frequency band according to a range of the second color value, and scaling a third value representing the received information in the third frequency band according to a range of the third color value.

In some embodiments, the assigning of the first color value, the second color value, and the third color value is non-linear such that an increment of a color value associated with a given increment of an intensity of a signal received by the GPR varies as the intensity of the signal increases.

In some embodiments, the first color value, the second color value, and the third color value are values from a color space, the color space comprising a Red-Green-Blue (RGB) color space or a YCbCr color space.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for producing one or more images associated with a ground-penetrating radar (GPR), comprising:
   receiving information representative of signals received by the GPR in response to transmission of radar signals and interaction thereof with one or more objects;
   determining at least three frequency bands associated with the received information;
   assigning a first color value to the received information corresponding to a first of the at least three frequency bands, a second color value to the received information corresponding to a second of the at least three frequency bands, and a third color value to the received information corresponding to a third of the at least three frequency bands;
   generating a color image for the one or more objects by combining the received information in all of the at least three frequency bands together,
      wherein color values in the color image indicate a size of the one or more objects, a depth at which the one or more objects is buried underground, or an electrical permittivity of the one or more objects.

2. The method of claim 1, comprising:
   generating a refined color image for the one or more objects by:
      adjusting the at least three frequency bands associated with the received information based on the color image or a prior information about the one or more objects; and
      refining the color image by assigning a fourth color value to the received information corresponding to a first of the adjusted frequency bands, a fifth color to the received information corresponding to a second of the adjusted frequency bands, and a sixth color to the received information corresponding to a third of the adjusted frequency bands.

3. The method of claim 2, comprising:
   determining a final color image by generating the refined color image iteratively.

4. The method of claim 1, wherein the at least three frequency bands partially overlap with each other.

5. The method of claim 1, wherein the at least three frequency bands have substantially similar widths.

6. The method of claim 1, wherein the first color value, the second color value, and third color value are assigned according to an optical frequency order of color values corresponding to a frequency order of the at least three frequency bands such that a color value having a lower optical frequency is assigned to a lower frequency band.

7. The method of claim 1, wherein the at least three frequency bands have different widths, and wherein a color value that has a lower optical frequency is assigned to a wider frequency band while a color value that has a higher optical frequency is assigned to a narrower frequency band.

8. The method of claim 1, wherein the at least three frequency bands comprise four frequency bands, the method further comprising:
   assigning a surface height value to the received information corresponding to a fourth of the four frequency bands such that the color image is three-dimensional.

9. The method of claim 1, wherein the at least three frequency bands comprise four or more frequency bands, the method further comprising:
   determining three frequency bands from the four or more frequency bands based on a prior information about the one or more objects or a ground in which the one or more objects are buried,
      wherein each of the three frequency bands is selected from the four or more frequency bands or is determined by combining one or more of the four or more frequency bands.

10. The method of claim 1, wherein the assigning of the first color value, the second color value, and the third color value comprises:
    scaling a value representing the received information in one of the at least three frequency bands corresponding to an overall range of values for a color space of the first color value, the second color value, and the third color value.

11. The method of claim 1, wherein the assigning of the first color value, the second color value, and the third color value comprises:
    scaling a first value representing the received information in the first frequency band according to a range of the first color value;
    scaling a second value representing the received information in the second frequency band according to a range of the second color value; and
    scaling a third value representing the received information in the third frequency band according to a range of the third color value.

12. The method of claim 1, wherein the assigning of the first color value, the second color value, and the third color value is non-linear such that an increment of a color value associated with a given increment of an intensity of a signal received by the GPR varies as the intensity of the signal increases.

13. The method of claim 1, wherein the first color value, the second color value, and the third color value are values from a color space, the color space comprising a Red-Green-Blue (RGB) color space or a YCbCr color space.

14. A signal processing system for producing one or more images associated with a ground-penetrating radar (GPR), comprising:
    a processor,
    a memory with instructions stored thereon, wherein the instructions upon execution by the processor cause the processor to:
       receive information representative of signals received by the GPR in response to transmission of radar signals and interaction thereof with one or more objects;
       determine at least three frequency bands associated with the received information;
       assign a first color value to the received information corresponding to a first of the at least three frequency bands, a second color value to the received information corresponding to a second of the at least three frequency bands, and a third color value to the received information corresponding to a third of the at least three frequency bands; and
       generate a color image for the one or more objects by combining the received information in all of the at least three frequency bands together,
          wherein color values in the color image indicate a size of the one or more objects, a depth at which the one or more objects is buried underground, or an electrical permittivity of the one or more objects.

15. The system of claim 14, wherein the processor is configured to:
  generate a refined color image for the one or more objects by:
    adjusting the at least three frequency bands associated with the received information based on the color image or a prior information about the one or more objects; and
    refining the color image by assigning a fourth color value to the received information corresponding to a first of the adjusted frequency bands, a fifth color to the received information corresponding to a second of the adjusted frequency bands, and a sixth color to the received information corresponding to a third of the adjusted frequency bands.

16. The system of claim 15, wherein the processor is configured to:
  determine a final color image by generating the refined color image iteratively.

17. The system of claim 14, wherein each frequency band is partially overlapping with another frequency band.

18. The system of claim 14, wherein the at least three frequency bands have substantially similar widths.

19. The system of claim 14, wherein the first color value, the second color value, and third color value are assigned according to an optical frequency order of color values corresponding to a frequency order of the at least three frequency bands such that a color value having a lower optical frequency is assigned to a lower frequency band.

20. The system of claim 14, wherein the at least three frequency bands have different widths, and wherein a color value that has a lower optical frequency is assigned to a wider frequency band while a color value that has a higher optical frequency is assigned to a narrower frequency band.

21. The system of claim 14, wherein the at least three frequency bands comprise four frequency bands, and wherein the processor is configured to:
  assign a surface height value to the received information corresponding to a fourth of the four frequency bands such that the color image is three-dimensional.

22. The system of claim 14, wherein the at least three frequency bands four or more frequency bands, and wherein the processor is configured to:
  determine three frequency bands from the four or more frequency bands based on a prior information about the one or more objects or a ground in which the one or more objects are buried,
  wherein each of the three frequency bands is selected from the four or more frequency bands or is determined by combining one or more of the four or more frequency bands.

23. The system of claim 14, wherein the processor is configured to assign the first color value, the second color value, and the third color value based on:
  scaling a value representing the received information in one of the at least three frequency bands corresponding to an overall range of values for a color space of the first color value, the second color value, and the third color value.

24. The system of claim 14, wherein the processor is configured to assign the first color value, the second color value, and the third color value based on:
  scaling a first value representing the received information in the first frequency band according to a range of the first color value;
  scaling a second value representing the received information in the second frequency band according to a range of the second color value; and
  scaling a third value representing the received information in the third frequency band according to a range of the third color value.

25. The system of claim 14, wherein the processor is configured to assign the first color value, the second color value, and the third color value is a non-linear manner such that an increment of a color value associated with a given increment of an intensity of a signal received by the GPR varies as the intensity of the signal increases.

26. The system of claim 14, wherein the first color value, the second color value, and the third color value are values from a color space, the color space comprising a Red-Green-Blue (RGB) color space or a YCbCr color space.

* * * * *